(12) United States Patent
Martin et al.

(10) Patent No.: US 6,210,584 B1
(45) Date of Patent: Apr. 3, 2001

(54) METHOD FOR TREATING AN AQUEOUS SOLUTION CONTAINING IONIC SPECIES TO BE EXTRACTED SELECTIVELY

(75) Inventors: Didier J. Martin, Givry; Christian G. Guizard, Montpellier; Jean H. Durand, Montpellier; Hélène C. Lecacheux, Montpellier, all of (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/464,548

(22) Filed: Dec. 15, 1999

(30) Foreign Application Priority Data

Dec. 23, 1998 (FR) .................................................. 98 16589

(51) Int. Cl.[7] .................................................. B01D 61/00
(52) U.S. Cl. .......................... 210/653; 210/651; 210/490; 430/399; 430/398
(58) Field of Search ..................................... 210/651, 653, 210/652, 490, 500.29, 500.41, 500.36, 500.43, 654; 430/400, 398, 399; 427/244, 255.28

(56) References Cited

U.S. PATENT DOCUMENTS 5,888,591 * 3/1999 Gleason et al. .
5,958,245 * 9/1999 Martin et al. .
5,989,433 * 11/1999 Martin et al. .

FOREIGN PATENT DOCUMENTS

1013335 A1 * 6/2000 (EP) .

* cited by examiner

Primary Examiner—Ana Fortuna

(57) ABSTRACT

A method for selectively extracted species from an aqueous solution which comprises contacting the aqueous solution with a membrane capable of selectively transporting species from a liquid to another, the membrane comprising a porous polymer support having an average surface pore size less than 100 nm, coated with a continuous layer of a fluorinated polymer obtained by plasma energized chemical vapor deposition (PECVD) using a plasma containing at least one fluorinated compound.

11 Claims, 2 Drawing Sheets

METHOD FOR TREATING AN AQUEOUS SOLUTION CONTAINING IONIC SPECIES TO BE EXTRACTED SELECTIVELY

FIELD OF THE INVENTION

The invention concerns a method for the treatment of aqueous solutions containing species to be extracted selectively, in particular for the treatment of photographic processing baths.

BACKGROUND OF THE INVENTION

It is customary to use porous polymer supports in separation methods as separating membrane. The transport of fluids across such membranes occurs by several mechanisms that depend on the structure and the nature of the porous support. The commonest membranes are synthetic or natural porous organic polymers. In these membranes the pores are interconnected and the solid matter represents only a small proportion of the total volume of the membrane. It is customary to modify the surface of these polymer supports by functionalization, or by low pressure plasma polymerization (less than 1,000 Pa).

The UIPAC nomenclature recognizes membranes for microfiltration (pore size greater than 50 mn), ultrafiltration (pore size between 2 nm and 50 nm), nanofiltration (pore size less than 2 nm), membranes for inverse osmosis (ultramicropore size less than 0.7 nm), and dialysis membranes that display characteristics close to some of the preceding categories (ultrafiltration, nanofiltration).

In photography, it is desirable to be able to regenerate photographic processing baths, especially of photographic developing agents. During the processing of exposed photographic products chemicals from the photographic products accumulate in the processing solutions. The presence of these compounds gradually lowers the efficiency of the bath.

In the case of a developing agent during the developing of silver halide photographic products, the developing bath becomes enriched in halide ions from the photographic product. When these ions are bromide or iodide, they considerably reduce the speed of the development of the image.

To avoid this problem, it is customary to replenish the bath by adding new developer, at the same time removing excess spent developer by overflow. The parameters of the replenishment are defined so as to maintain a halide concentration that will not adversely affect the efficiency of the developing bath.

With this method, it is necessary to adjust the bath replenishment parameters for each type of photographic product treated. In addition, it generates unwanted liquid photographic effluent.

For several years photographic bath treatment methods have been under development to recycle all or part of these seasoned baths. In the case of photographic developing agents, selective membranes have been used to remove bromide ions. For example patent application PCT/WO 9501541 describes a selective membrane with a hydrophobic surface obtained by sol-gel treatment from fluoroalkoxide.

To make continuous or discontinuous photographic bath replenishment efficient, it is necessary to extract those species that tend to reduce the efficiency of the bath, without modifying the other parameters of the processing bath, in particular, without modifying the concentration of any of the chemicals useful for the photographic development, the pH, etc. In particular it is most desirable to be able to control the water flow to avoid dilution of the processing bath.

SUMMARY OF THE INVENTION

The object of this invention is a new method for treating an aqueous solution containing species that are to be extracted selectively such as halide ions or organic molecules, while maintaining control over water flow. The invention concerns a method for selectively extracting species from an aqueous solution which comprises contacting the aqueous solution with a membrane capable of selectively transporting species from a first liquid to a second liquid, the membrane comprising a porous polymer support having an average surface pore size less than 100 nm, coated with a continuous layer of a fluorinated polymer obtained by PECVD using a plasma containing at least one fluorinated compound.

In one embodiment, the membrane has a surface with an F/C ratio greater than or equal to 0.7.

The method of the invention is particularly efficient for the treatment of photographic baths containing halide ions, such as bromide, iodide and chloride.

BRIEF DESCRIPTION OF THE DRAWINGS

The description below refers to the drawings in which.

DETAILED DESCRIPTION OF THE INVENTION

The method of the invention is carried out with a porous polymer support that has been treated by plasma energized chemical vapor deposition (PECVD). This surface modification method is known, and consists in a surface modification using a gaseous phase containing reactive species generated by a low pressure plasma. This method is described in *Surface Science Reports* 24 (1996) 1–54 by C-M Chan et al.

In the scope of the invention, the membrane is obtained from a PECVD treatment that is carried out using a plasma containing fluorinated compounds in an inert gas. Any organic or inorganic fluorinated compound that can be transported in the vapor phase can be used in the scope of this invention. For example, tetrafluoromethane, hexafluoroethane, tetrafluoroethylene, octafluorocyclobutane, hydrogen fluoride, nitrogen trifluoride, sulfur hexafluoride, difluorodibromomethane, etc., can be used.

The quantity of fluorinated compounds in the inert gas is in general at least 5%, and preferably between 10 and 100%.

The inert gas is generally a noble gas. For example, argon or helium are commonly used.

The porous polymer supports that can be used in the invention are supports that can have symmetrical, asymmetrical and(or) composite structures. Examples of supports are described in *Osmose inverse et ultrafiltration* chapter II entitled 'Technology et applications', by Alain Maurel, in *Techniques de l'ingénieur J*2796 pages 4 to 13.

The membranes for microfiltration, ultrafiltration, nanofiltration, inverse osmosis and dialysis described above can be used to implement this invention.

These supports are for example supports made of cellulose, or cellulose derivatives, preferably regenerated cellulose, or supports made of polyacrylonitrile, polysulfone, polyethersulfone, or fluorocarbon polymers such as polyvinylidene fluoride, polyethylene, polypropylene, etc.

The porous polymer supports that can be used in the scope of the invention have to tolerate the PECVD treatment (no damage to the structure of the material), and be able to form a continuous layer.

The porosity of the support is chosen according to the type of treatment envisaged for the selective separation of the relevant species, provided the surface pore size is less than 100 nm. In particular it needs to have a chemical tolerance to the solution to be treated.

The porous polymer supports can have a planar, spiral or tubular shape, or can be hollow fibers.

Figure 1:
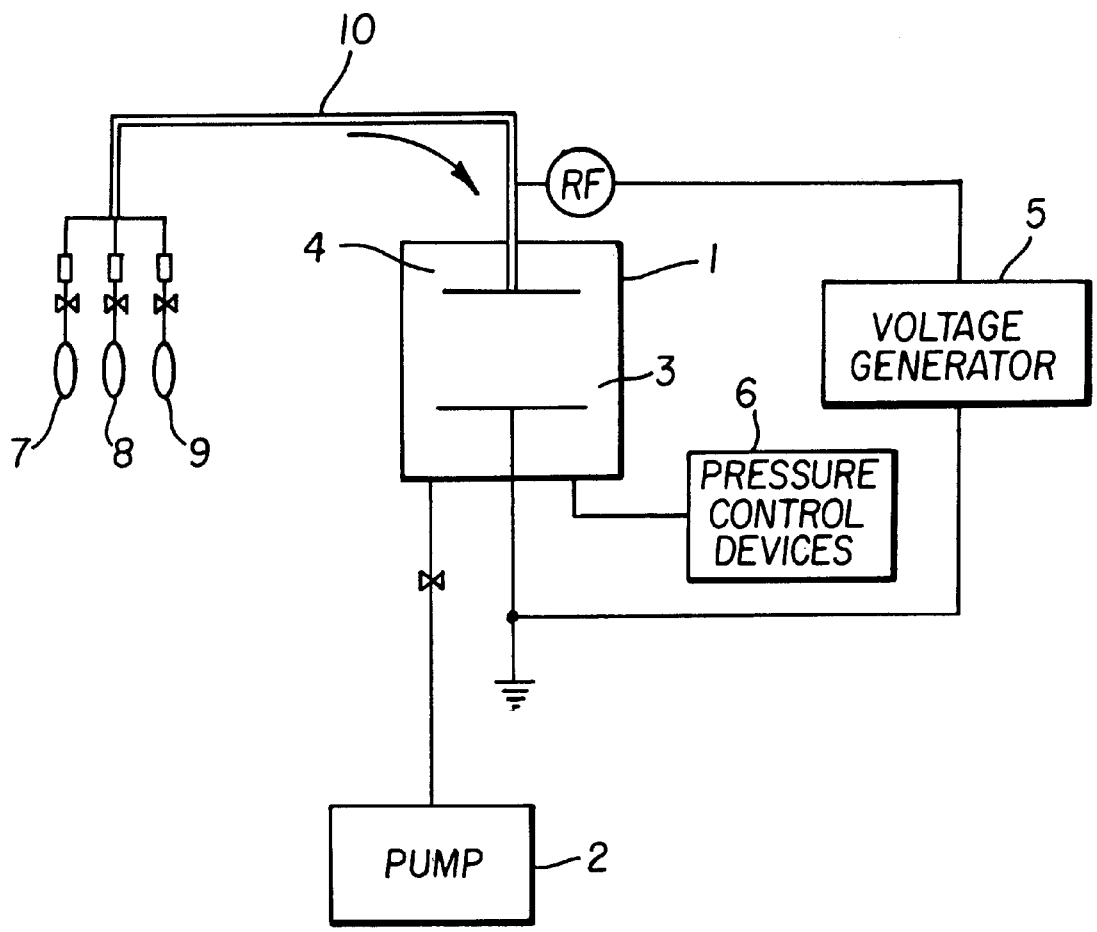
FIG. 1 represents an embodiment of the method for manufacturing the membrane that is useful in this invention.

From such a porous polymer support, a membrane useful to the present invention can be obtained by a static or dynamic PECVD process. FIG. 1 shows that a static embodiment of the process.

This FIG. 1 shows a chamber 1 made of stainless steel that is evacuated using the pump 2, an upper hollow electrode 4, a lower electrode 3, an alternating voltage generator 5, and pressure control devices 6. The electrodes 3 and 4 can have a planar and circular form. The gases are introduced through the piping 10 at the level of the upper electrode 4 at a total pressure of at least 20 Pa, preferably between 20 Pa and 120 Pa. When the disk electrodes 3 and 4 are both planar and circular with a diameter of 10 cm, the gap between the two electrodes 3 and 4 is about 5 cm. A potential difference is applied to the terminals of the two electrodes using an alternative voltage generator 5. The gas flow rates are controlled using mass flow meters 7, 8, 9.

The pressure in the reactor is generally less than 1,000 Pa, and the frequency delivered by the voltage generator is at least 2 kHz.

Membranes can also be obtained by treatment in a plasma reactor using a dynamic process in which the reactor is equipped with a device to move the support to be treated, not shown in FIG. 1.

In one embodiment of the invention, the method is carried out with a pre-conditioned membrane. A pre-conditioned membrane is a membrane contacted dynamically or statically with water, which can contain a compounds that improves the wettability of the membrane by the solution to be treated. For example the membrane can be conditioned with an alcohol or an electrolyte such as an aqueous solution containing potassium bromide or an aqueous solution containing a lower alkanol, for example ethanol in varying amounts.

It has been found that when the membrane is pre-conditioned the flow of species to be extracted is markedly increased.

Figure 2:
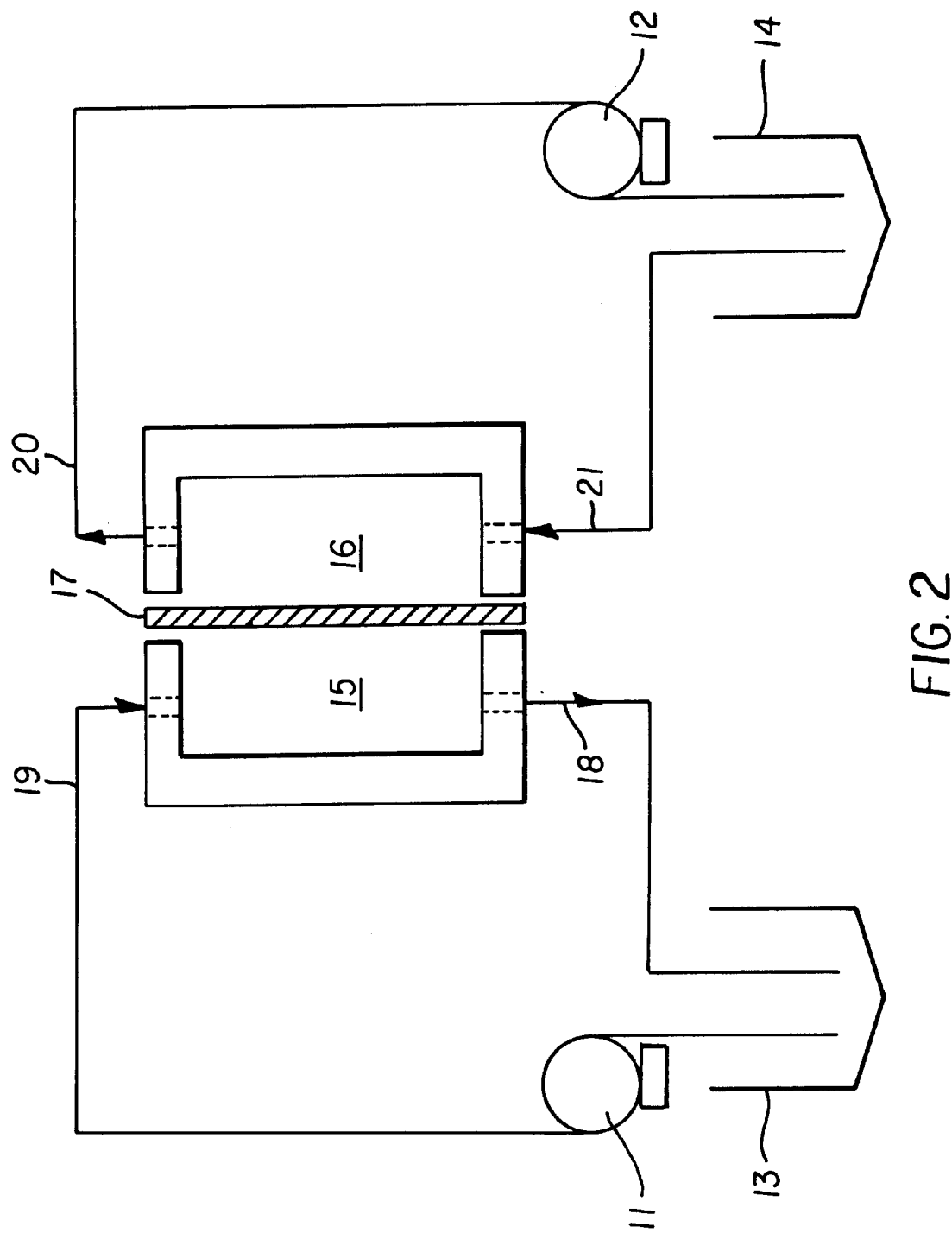
FIG. 2 represents a specific embodiment of the method of treatment of an aqueous solution containing species to be extracted selectively.

To implement the method of the invention, such a membrane is placed in contact with the aqueous solution containing the species to be extracted. This can be made through a contactor An embodiment of the method of the invention is shown in FIG. 2. This figure shows two compartments 15 and 16 separated by a membrane 17, the whole forming a fluid-tight system, storage tanks 13 and 14, and pumps 11 and 12.

The solution to be treated, held in the tank 13, is pumped into the compartment 15 through the inlet 19 and out through the outlet 18 using the pump 11. Water held in the tank 14 is pumped backwards into the compartment 16 through the inlet 21 and out through the outlet 20 using the pump 12.

In this example, the solution flowing into the compartment 16 takes up the species to be extracted.

The photographic baths that can be treated with the process of the invention are conventional photographic processing baths such as developers, fixers, bleaching baths, or bleaching-fixing baths. The method of this invention is particularly efficient for the treatment of photographic baths containing ionic species to be extracted selectively, such as bromide, chloride, iodide, sulfate and thiocyanate ions.

In addition, it has been found that the method of treatment of the invention also extracts some of degraded organic molecules, for example of oxidized developing agent, which when present in the developing bath, impair the efficiency of the photographic processing treatment.

With the method of the invention, ionic species were selectively extracted from a photographic bath containing photographically useful organic compounds, while maintaining a controlled water flow.

The process of the invention is particularly efficient for the treatment of photographic developers containing bromide ions to be selectively extracted.

It is also possible selectively to extract bromide ions contained in a photographic developer without extracting the photographically useful compounds in the developer. The efficiency of the processing bath is thereby maintained, without diluting the treated developer.

This invention is described in more detail in the examples below.

EXAMPLE 1

A Spectra pore® (42 cm$^2$) regenerated cellulose support with a cut-off threshold of 6,000 to 8,000 daltons (pore diameter about 2 nm) was placed in a plasma reactor as shown in FIG. 1. The fluorinated gas plasma comprised octafluorobutene diluted in argon (50/50, flow rate 10 ml/min measured at standard temperature and pressure).

The reaction conditions were as follows:

| Power: | 25 watts |
| --- | --- |
| Frequency: | 110 kHz |
| Pressure: | 200 Pa |

Three samples of support were thus treated, with a range of treatment durations as indicated in Table 1 below. For each membrane, the solid-liquid contact angle was measured. This angle of contact was measured by placing a drop of twice-distilled water on the treated surface, and then measuring the angle that the drop made with the surface using a goniometer coupled to a converging lens.

The membranes were then statically conditioned in water for 15 minutes at ambient temperature.

The membranes were tested using the device shown in FIG. 2, in which the tank 15 held 500 ml of a developer to be treated, and the tank 16 held 180 ml of circulating water. The developer and the water circulated in opposite directions with a flow rate of 25 ml/min.

A used KODAK RP-XOMAT® developer, with the composition below, was thus treated for the purpose of selectively removing bromide ions.

Composition of the developer

| Composition of the developer | |
| --- | --- |
| hydroquinone (HQ) | 25.00 g/l |
| hydroquinone monosulfate (KHQS) | 8.40 g/l |
| phenidone-A (Ph.A) | 1.25 g/l |
| bromide ions | 3.00 g/l |
| sodium bicarbonate | 7.12 g/l |
| potassium hydroxide | 25 g/l |
| potassium sulfite | 44 g/l |
| Water in sufficient quantity to obtain 1 l of solution | |
| pH adjusted to 9.9 | |

Each experiment was run for 24 h. For each membrane the water flow (%H$_2$O/24 h), the extracted bromide amount (%Br/24 h) and the selectivity of the membrane for bromide relative to the organic compounds present in the developer (HQ, KHQS, Ph.A) were determined.

The results are given in Tables 1 and 2 below, in which:

* %H$_2$O/24 h=100(Vf$_{rev}$−Vi$_{rev}$)/Vi$_{rev}$, where Vf$_{rev}$ is the final volume of developer after 24 h treatment with the membrane, and Vi$_{rev}$ is the initial volume of the developer (%H$_2$O/24 is the volume of water transferred to the developer in 24 h). % bromide extracted=(1−(C$^t$Br/C$^0$Br))×100 where C$^0$Br is the number of moles of bromide initially present in the developer, and C$^t$Br is the number of moles of bromide in the developer at time t.

The percentage of bromide extracted was calculated at two times: (1) after 24 h operation, and (2) in the period of operation when the extraction rate was maximal (before reaching the point of inflection corresponding to the point of equilibrium between the developer and the aqueous solution (permeate)). * Selectivity Br/HQ+KHQS=% Br extracted/ %(HQ+KHQS) extracted, where %(KQ+KHQS) extracted= (1−(C$^t$HQ+KHQS/C$^0$HQ+KHQS))×100, where C$^0$HQ+ KHQS is the number of moles of hydroquinone and hydroquinone monosulfate initially present in the developer, and C$_t$HQ+KHQS is the number of moles of hydroquinone and hydroquinone monosulfate in the developer at time t.

The same procedure was used to determine the extraction selectivity of bromide ions relative to the other compounds cited above. * F/C is the fluorine/carbon ratio of the surface of the sample after the PECVD treatment.

For the control membrane and the membrane C, the experiments were carried out in two 24 h runs. At the end of the first run, the circuits were flushed and two new solutions (used developer and water) were added.

TABLE 1

| | Duration of reaction | % H2O/24 h | F/C | Angle of contact |
| --- | --- | --- | --- | --- |
| Control (untreated cellulose) | — | 6 | 0 | 36° |
| B (treated cellulose) | 3 min. | 6.4 | 1.1 | 108° |
| C (treated cellulose) | 5 min. | 3 | 1.35 | 111° |

TABLE 2

| | % Br | | Br/HQ + KHQS | | Br/HQ | | Br/Phen-A | |
| --- | --- | --- | --- | --- | --- | --- | --- | --- |
| Duration | Max (1) | 24 h (1) | Max (2) | 24 h (1) | Max (2) | 24 h (1) | Max (2) | 24 h (1) |
| Control 1 | 22 (11 h) | 29 | 2.4 | 1.3 | 1.9 | 1.5 | 1.8 | 1.5 |
| Control 2 | 18 (11 h) | 20 | 3.4 | 1.15 | 1.8 | 1.6 | 2.8 | 1.5 |
| B | 25 (1.5 h) | 32 | 20.0 | 1.6 | 6.8 | 2.4 | 5.0 | 2.0 |
| C1 | 22 (9 h) | 27 | — | 3.1 | 19.6 | 10.4 | 3.7 | 2.1 |
| C2 | 25.5 (9 h) | 29.4 | — | 7.6 | 17.3 | 16.3 | 5.2 | 3.0 |

—means INFINITE; i.e., the proportion of organic molecules extracted is practically nil relative to the quantity of bromide extracted.

Table 1 shows the influence of the PECVD treatment on the water flow as a function of the value of the angle of contact. The PECVD treatment allowed close control over the swelling of the membrane and its aging in the developer solution.

The results given in Table 2 show that the method of treatment of the invention had a high extraction selectivity for bromine ions relative to organic compounds such as HQ, KHQS and phenidone-A. Also this selectivity did not vary according to the water flow across the membrane.

These results also show that the selectivity of the membrane was better in the second run.

EXAMPLE 2

In this example, the membranes described above were tested in the same operating conditions, but this time for the extraction of bromides contained in the color developer of the KODAK C41® process for the developing of negative color photographic products.

The composition of the C41® color developer treated was as follows:

| | |
|---|---|
| CD4 | 3.3 g/l |
| Sulfate | 3.7 g/l |
| Sulfite | 0.85 g/l |
| Bromide | 1.11 g/l |

The results are given in Table 3 below.

TABLE 3

| | % Br extracted | Br/CD4 | Br/$SO_3^-$ | Br/$SO_4^{2-}$ |
|---|---|---|---|---|
| Control | 24 (24 h) | 5.02 | 7.9 | 1.6 |
| C1 | 29 (12 h) | 7.51 | 19.3 | 2.4 |
| C2 | 26 (4 h) | — | 17.3 | 5.0 |

These results show the advantages of the membrane selectivity in this invention. The water flow observed for the control and the membrane C (for the two runs C1 and C2) was 4% in volume per 24 h. As in Example 1, an increase in extraction selectivity for bromide ions was observed in the second run, with a faster extraction (4 h instead of 12 h).

EXAMPLE 3

In this example, the membranes described above were evaluated in the same operating conditions, but this time for the extraction of bromide ions contained in the color developer of the KODAK E6® process for developing positive color photographic products.

The composition of the E6® color developer treated is as follows:

| | |
|---|---|
| CD3 | 4.7 g/l |
| Sulfate | 4.5 g/l |
| Sulfite | 1.5 g/l |
| Citrazinic acid | 0.25 g/l |
| Dithio-octanediol | 0.65 g/l |
| Bromide | 0.92 g/l |

The selectivity results are given in Table 4 below.

TABLE 4

| | % Br extracted | Br/CD3 | Br/acid | Br/DTOD |
|---|---|---|---|---|
| Control | 27 (24 h) | 56 | 2.9 | 2.4 |
| C1 | 31 (20 h) | 120 | 3.7 | 2.6 |
| C2 | 30 (16 h) | 85 | 6.1 | 2.9 |

These results show the advantages of the membrane selectivity in this invention. As in example 2, the rate of extraction of bromide ions was improved in the second run (C2, 16 h instead of 20 h).

EXAMPLE 4

A polyvinylidene fluoride support, PVDF 3065® commercialized by RHODIA ORELIS, having a cut-off threshold of 40 kD, was placed in a plasma reactor as shown in FIG. 1. The gaseous fluorinated plasma contained carbon tetrafluoride in argon (50/50). The gas flow rate was about 10 ml/min. measured at standard temperature and pressure. The reaction conditions were as follows:

| | |
|---|---|
| Power: | 20 watts |
| Frequency: | 40 kHz |
| Pressure: | 60 Pa |

Several samples of the support were thus treated with ranging treatment durations as indicated in the table below.

For each membrane thus obtained, the solid-liquid angle of contact was determined using the method described above.

The membranes were then conditioned in ethanol and stored in water for at least 1 h before being installed in the device shown in FIG. 2 in the conditions described above, except that the tank 15 contained RP X-OMAT developer with the following composition:

| | |
|---|---|
| hydroquinone (HQ) | 27 g/l |
| hydroquinone monosulfate (KHQS) | 7 g/l |
| phenidone-A (Ph.A) | 1.5 g/l |
| bromide ions | 1.7 g/l |
| sodium bicarbonate | 7 g/l |
| potassium hydroxide | 25 g/l |
| potassium sulfite | 44 g/l |
| Water in sufficient quantity to obtain 1 l of solution | |
| pH adjusted to 9.9 | |

The following results were obtained:

TABLE 5

| | Duration of reaction | Angle of contact | F/C | % $H_2O$/24 h |
|---|---|---|---|---|
| Ex. 4.1 | 0 | 67 | 0.67 | −30% |
| Ex. 4.2 | 1 min. | 95 | 1.02 | +3% |
| Ex. 4.3 | 2 min. | 107 | 1.20 | +7% |
| Ex. 4.4 | 3 min. | 98 | 1.25 | +5% |

These results show that the PVDF membranes treated by PECVD allowed the water flow to be controlled.

EXAMPLE 5

In this example, the membranes described below were tested in the same conditions as in the preceding examples.

A PVDF membrane not treated with plasma (Ex. 5.0).

A membrane of example 4.3 (CF$_4$/argon treatment for 2 min.) but not conditioned (Ex 5.1).

A membrane of example 4.3 conditioned with water (Ex. 5.2).

A membrane of example 4.3 conditioned with ethanol (Ex. 5.3).

A membrane of example 4.3 conditioned with a solution of KBr (3 g/l) (Ex 5.4).

The results are given in Table 6.

TABLE 6

|  | % H$_2$O (24 h) | % Br extracted (24 h) | Br/HQ + KHQS | Br/Ph.A |
|---|---|---|---|---|
| Ex. 5.0 | 31 | 21 | 1.65 | 1.60 |
| Ex. 5.1 | 4 | 11 | 3.7 | — |
| Ex. 5.2 | 5 | 25 | 5 | 2 |
| Ex. 5.3 | 5.2 | 22 | 6 | 2.6 |
| Ex. 5.4 | 3.6 | 15 | — | — |

—infinite

These results show that only in the scope of the invention was the flow of water perfectly controlled. These examples also show that the conditioning of the membrane allowed the percentage extraction of bromide ions to be increased and the selectivity of the extraction of bromide ions relative to hydroquinone to be improved.

The invention has been described in detail with particular reference to certain preferred embodiments thereof, but it will be understood that variations and modifications can be effected within the spirit and scope of the invention.

What is claimed is:

1. A method for selectively extracting species from an aqueous solution which comprises
    contacting the aqueous solution with a membrane capable of selectively transporting species from a first liquid to a second liquid, the membrane comprising a porous polymer support having an average surface pore size less than 100 nm, coated with a continuous layer of a fluorinated polymer obtained by plasma energized chemical vapor deposition (PECVD) using a plasma containing at least one fluorinated compound.

2. The method according to claim 1 wherein the fluorinated polymer layer has a F/C ratio greater than or equal to 0.7.

3. The method according to claim 1 wherein the fluorinated compound is a fluoroalkyl compound.

4. The method according to claim 1, wherein the fluorinated compound is tetrafluoromethane, hexafluoroethane, tetrafluoroethylene, octafluorocyclobutane, hydrogen fluoride, nitrogen trifluoride, sulfur hexafluoride, difluorodibromomethane, alone or in a mixture.

5. The method according to claim 1 wherein the porous polymer support is cellulose, polyacrylonitrile, polysulfones, polyethersulfones, fluorocarbon polymers, polyethylene, or polypropylene.

6. The method according to claim 1 wherein the membrane is a pre-conditioned membrane with an aqueous solution able to improve the wettability of the membrane.

7. The method according to claim 1 wherein the aqueous solution containing species to be extracted is a photographic processing bath.

8. The method according to claim 7 wherein the species to be extracted are ionic species.

9. The method according to claim 8 wherein the species to be extracted are bromide, chloride, iodide, sulfate, or thiocyanate ions.

10. The method according to claim 7 wherein the photographic processing bath is a bath containing bromide and(or) iodide ions to be extracted selectively.

11. The method according to claim 1 wherein the membrane presents a solid-liquid contact angle greater than or equal to 80°.

* * * * *